I. Miller,
Cage Trap,
No. 68,776.   Patented Sep. 10, 1867.
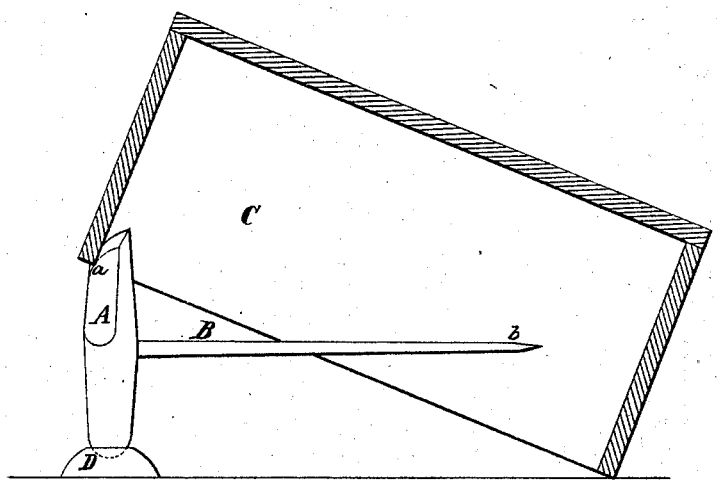
Witnesses.
Theo Tusche
J. A. Service.
Inventor:
I. Miller
Per Munn & Co
Attorneys

UNITED STATES PATENT OFFICE.

ISRAEL MILLER, OF BRYAN, OHIO.

IMPROVEMENT IN DEVICE FOR SETTING ANIMAL-TRAPS.

Specification forming part of Letters Patent No. 68,776, dated September 10, 1867.

*To all whom it may concern:*

Be it known that I, ISRAEL MILLER, of Bryan, Williams county, Ohio, have invented a new and Improved Trap-Setter; and I do hereby declare that the following is a full, clear, and exact description thereof, which will enable others skilled in the art to make and use the same, reference being had to the accompanying drawings, forming part of this specification.

This invention relates to an improved trap-setter; and consists of a shaft carrying a baiting-rod.

A common box or cage will serve for a trap, which is placed inverted, with one edge on the ground and the opposite edge resting on a flange on the outer edge of the shaft. The shaft is set on edge in a cup, so that a very slight touch on the end of the baiting-rod is sufficient to upset it, when the box-trap falls, confining the game without injuring it.

The accompanying drawing is a side view of my improved trap-setter, showing the box or cage in position.

A is the upright shaft in which the baiting-rod B is carried, the bait being placed on the end $b$. The shaft A has a flange or ledge, $a$, or its equivalent, on which the box trap or cage C is set, as shown in the drawing.

The shaft A is set in the cup D, and a very small force applied at $b$, in any direction, will serve to dismount the shaft, when the box-trap or cage C falls, catching the game.

Having thus described my invention, what I claim as new, and desire to secure by Letters Patent, is—

1. The shaft A, furnished with the flange $a$, or its equivalent, in combination with the baiting-rod B, substantially as described.

2. The cup D, in combination with a flanged shaft, A, or its equivalent, substantially as shown and described.

ISRAEL MILLER.

Witnesses:
 JOHN NEWCOMER,
 ALVIN F. CLARK.